H. RAUSCHER.
CALCULATING MACHINE.
APPLICATION FILED SEPT. 24, 1913.
1,136,484.
Patented Apr. 20, 1915.
4 SHEETS—SHEET 1.
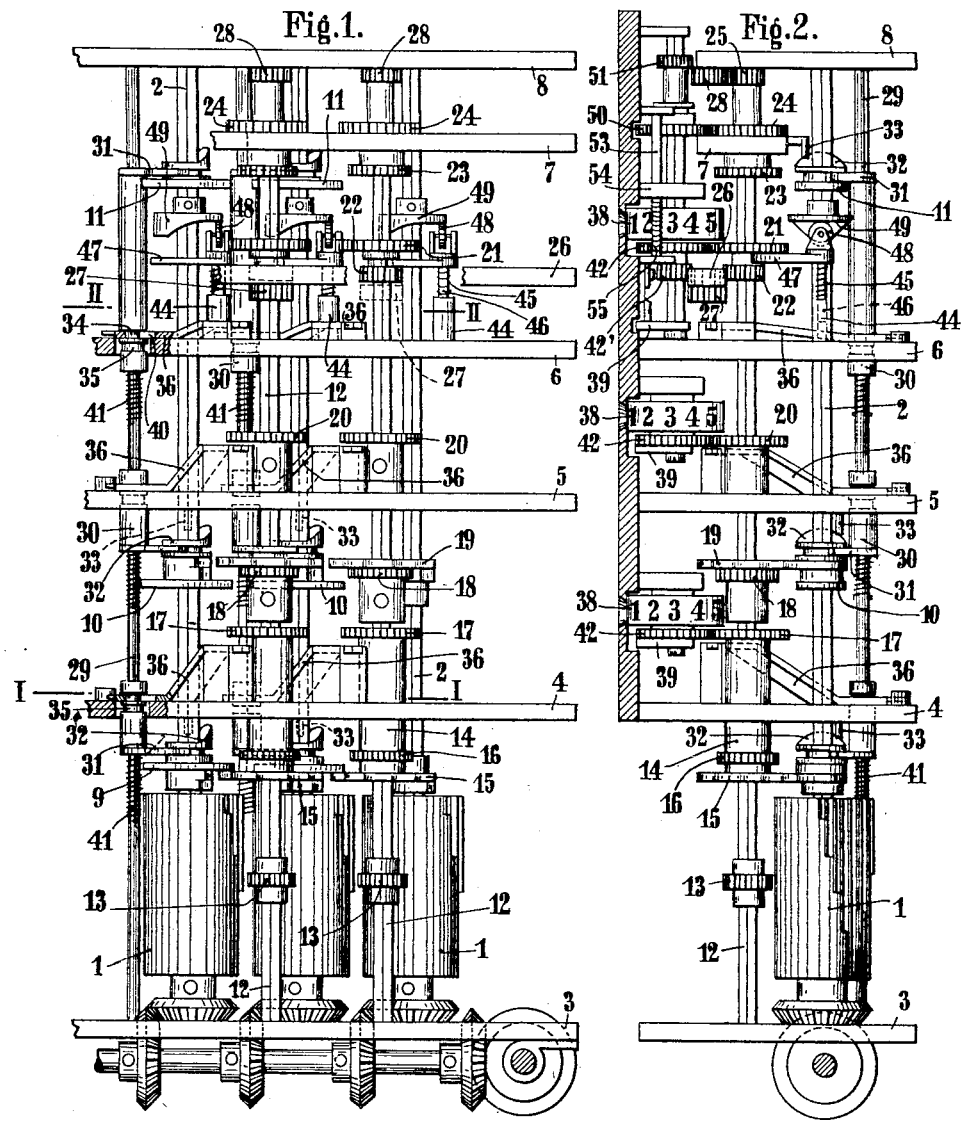
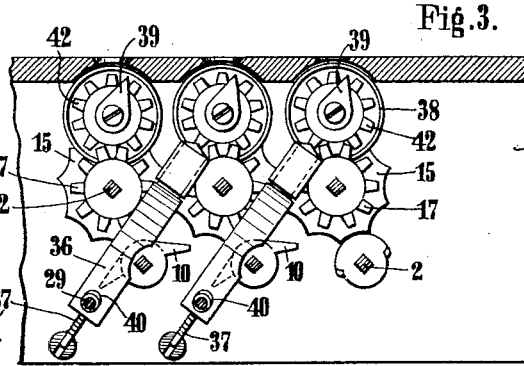

H. RAUSCHER.
CALCULATING MACHINE.
APPLICATION FILED SEPT. 24, 1913.
1,136,484.
Patented Apr. 20, 1915.
4 SHEETS—SHEET 2.
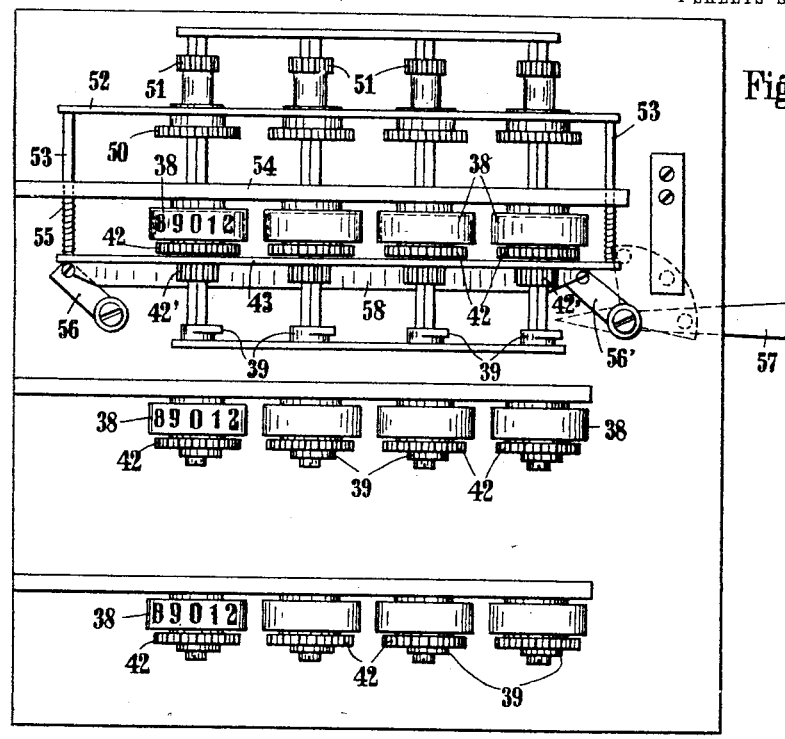
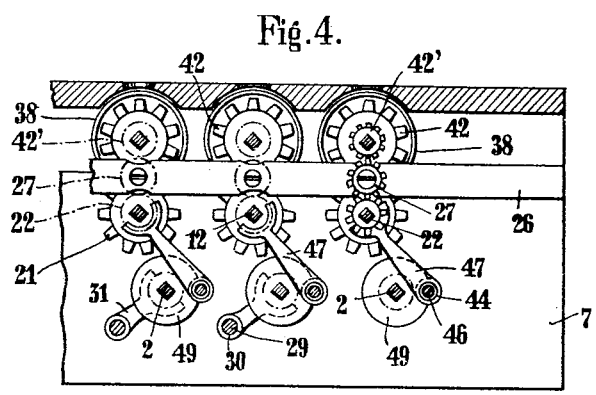
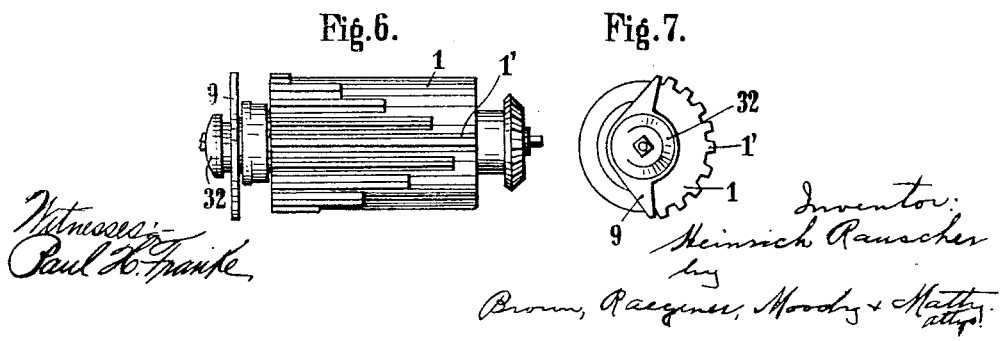

H. RAUSCHER.
CALCULATING MACHINE.
APPLICATION FILED SEPT. 24, 1913.

1,136,484.

Patented Apr. 20, 1915.
4 SHEETS—SHEET 3.

Witnesses
Paul H. Franke

Inventor
Heinrich Rauscher
by
Brown, Raegner, Mordy & Matt
Attys

H. RAUSCHER.
CALCULATING MACHINE.
APPLICATION FILED SEPT. 24, 1913.

1,136,484.

Patented Apr. 20, 1915.
4 SHEETS—SHEET 4.

UNITED STATES PATENT OFFICE.

HEINRICH RAUSCHER, OF VIENNA, AUSTRIA-HUNGARY.

CALCULATING-MACHINE.

1,136,484.  Specification of Letters Patent.  Patented Apr. 20, 1915.

Application filed September 24, 1913. Serial No. 791,460.

*To all whom it may concern:*

Be it known that I, HEINRICH RAUSCHER, a citizen of the Austrian Empire, and resident of Vienna, Austria-Hungary, have invented certain new and useful Improvements in Calculating-Machines, of which the following is a specification.

My invention relates to a calculating machine and has for its object to simplify the use and the construction of the machine.

Essential features of my new machine consist therein, that the shafts of the number wheels of the counters of the machine are arranged parallelly to the actuating shafts of the counters, whereby opportunity is given to bring the wheels of the counters in a very simple manner out of and into engagement with the actuating wheels by laterally shifting. Such arrangement is of advantage in so far, as it allows lateral displacement of the slide carrying the counters, and actuating of the zero resetting device without raising the slide from its support on the machine.

Other features of my invention consist in means for indicating the result of calculating operations on several independent counters, so that it becomes possible to use for instance the first counter as adding counter and the second counter as a subtracting counter or vice-versa, or to use the first counter as a counter for indicating partial results of calculations and the second counter as a counter for indicating final results.

My invention also relates to a calculating machine of that type where stepped toothed cylinders are used for actuating the number wheels of the machine.

The invention particularly refers to constructional means in connection with machines of the above named type allowing an operation of the machine in opposite directions so as to perform with the machine adding and subtracting operations without using change gears.

With these ends in view I construct my calculating machine as appears from the embodiment illustrated on the accompanying drawings.

Figure 8:
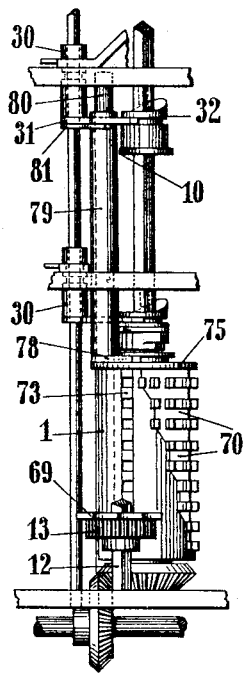
Figure 9:
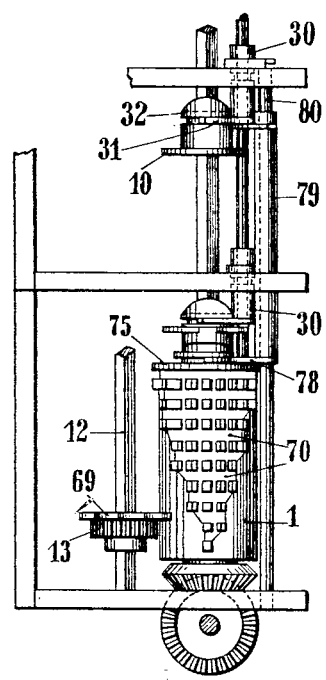
Figure 10:
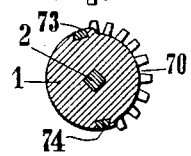
Figure 12:
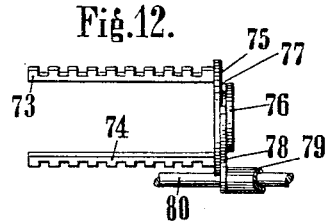
Figure 11:
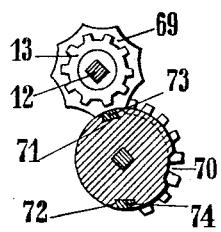
Figures 13, 14:
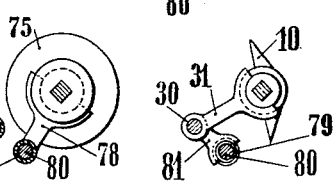
Figure 15:
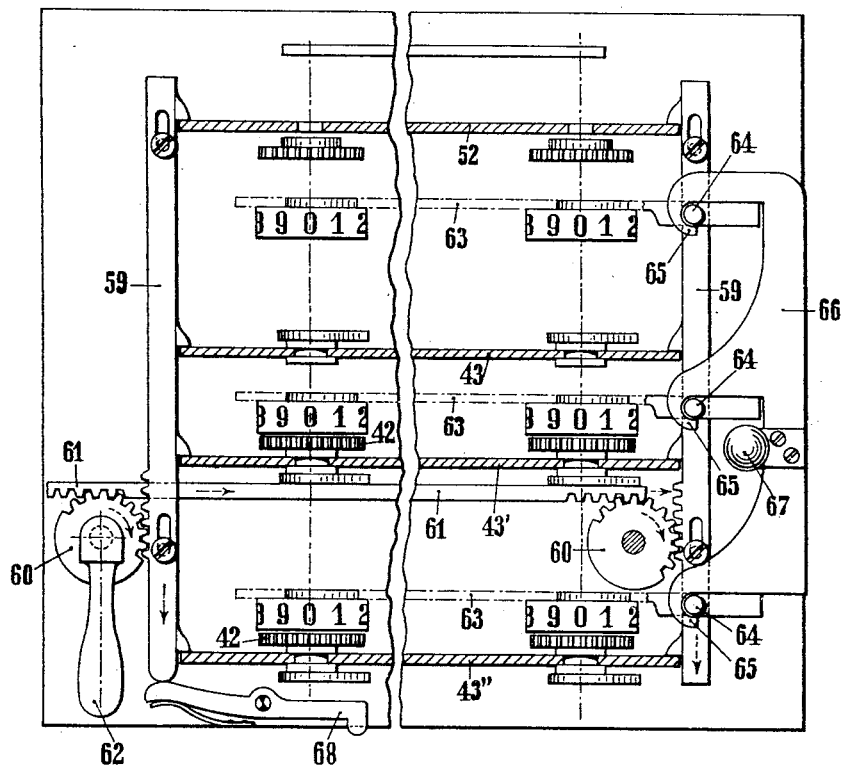

Figure 1 is a plan of a part of the calculating machine the top cover being removed. Fig. 2 is a vertical section through the machine. Fig. 3 illustrates the device for transferring tens in a section on line I—I of Fig. 1. Fig. 4 is a section on line II—II of Fig. 1. Fig. 5 shows the movable top part of the machine with the number wheels attached to a transparent top plate. Figs. 6 and 7 show in plan and in elevation a novel form of a stepped toothed cylinder. Fig. 8 is a plan and Fig. 9 a side elevation of a modified form of the stepped toothed cylinder showing at the same time the operative connections therewith. Figs. 10 to 14 are details relating to the mechanism shown in Figs. 8 and 9. Fig. 15 is a simplified zero resetting mechanism.

Referring more in detail to Figs. 1 to 7 showing the essential elements of the type of machine, to which the invention relates, the stepped toothed cylinders are designated with the numeral 1. These cylinders are firmly mounted on rotatable shafts 2 having their bearings at opposite ends in plates 3 and 8. Plates 4 to 7 intermediate the plates 3 and 8 form carriers for further elements of the machine.

9, 10 and 11 are carry pawls for transferring tens from one number wheel to the number wheel of the next order in the three counter systems of the machine.

12 are shafts mounted parallelly to the cylinders 1 and carrying on a part of square section slidable gear members 13 adapted to coöperate with the teeth on cylinders 1.

14 are sockets loosely mounted on round sections of shafts 12 carrying each a locking wave wheel 15, a tens transferring wheel 16 and an actuating wheel 17 adapted to coöperate with the counter indicating the number of crank revolutions. Firmly mounted on each shaft 12 is a tens transferring wheel 18 with locking wave wheel 19 and a counter transferring wheel 20. Wheels 18, 19 and 20 correspond to wheels 16, 15 and 17 and operate the so-called first counter of the machine indicating the result of the calculating operation. Wheels 21, 22 are mounted shiftable on each shaft 12 and are adapted to operate the second counter of the machine.

23 is a tens transferring wheel for the second counter and 24, 25 a second set of actuating wheels for the second counter of the machine. Wheels 23, 24 and 25 are fixed to a sleeve freely rotatable on shaft 22.

26 is a bar intermediate plates 6 and 7 carrying wheels 27, said wheels 27 adapted to be coupled with wheels 22.

28 are wheels rotatably carried by plate 8 and in permanent engagement with wheels 25.

29 are rods mounted below shafts 2 and somewhat laterally displaced with relation to said shafts. Slidable on rods 29 are sleeves 30 provided with forks 31 engaging grooved cams 32 slidable on shafts 2 and connected each with one of the carrying pawls 9, 10, 11.

33 are pins firmly connected to the machine frame and coöperating with cams 32.

Each sleeve 30 is provided with two grooves 34, 35 adapted to coöperate with slides 36.

37 are springs pressing slides 36 into normal position. Slides 36 are elements of the tens transferring mechanism of the counters. The number wheels of the three counters are designated with the numeral 38.

39 are arms firmly mounted on the shafts of number wheels 38 and adapted to set slides 36 preparatory to the transfer of tens.

40 are holes adapted to give free passage to sleeves 30.

41 are springs tending to permanently keep sleeves 30 in engagement with slides 36, the slides being permanently pressed with the edges of holes 40 into grooves 34 or 35 of said sleeves 30.

The number wheels 38 of each of the counters are each permanently connected with toothed wheels 42. The toothed wheels 42 of the counter indicating the number of crank revolutions and of the so-called first counter of the machine are firmly connected to said number wheels 38 and in coöperation with wheels 17 and 20 on shafts 12 respectively.

The wheels 42 coördinated to number wheels 38 of the so-called second counter are connected to sleeves on the shafts carrying the said number wheels. Firmly connected to such sleeves are toothed wheels 42'.

43 is a bar engaging all the sleeves carrying the said wheels 42, 42' of the so-called second counter and allowing simultaneous axial displacement of said sleeves on the carrying shafts. Such actuation of the sleeves of wheels 42, 42' has the effect of bringing either wheels 42 into engagement with wheels 21 or wheels 42' into engagement with wheels 27 so that the number wheels 38 of the second counter are either rotated in one direction by engagement of wheels 42 with wheels 21 or in the opposite direction by engagement of wheels 42' with wheels 27.

It is remarkable that the device described allows the change of the working direction of the so-called second counter by displacement of transmission gears 42, 42' within the slide of the machine instead of reversing the actuating gear of the machine itself.

In order to allow the transfer of the tens in both counters independently from each other means are provided to disengage the second counter from the actuating device of the machine on each rotation of the actuating crank during the interval where the transfer of the tens is effected in the first counter. These means for disengaging the second counter from the first counter are as follows.

Fixed to plate 6 are guides 44 carrying shiftable pins 46 surrounded by springs 45. The pins 46 are each provided with an arm 47 engaging a circular groove between wheels 21 and 22. The free end of each pin 46 has mounted thereon a roller 48 in frictional contact with a cam wheel 49 firmly mounted on shaft 2. On rotation of shaft 2 wheels 21, 22 are periodically shifted on carrying shaft 12 by coöperation of said cam wheel 49 with said roller 48 on pin 46 with the effect that said wheels 21, 22 are on each rotation of shaft 12 out of engagement with wheels 42 and 27 respectively during a time interval where a transfer of tens may possibly take place in the first counter. The second counter is coupled with the shafts 12 only as long as on each rotation of the actuating crank of the machine the gear wheel 13 is in engagement with the stepped teeth of cylinders 1. On further rotation of shafts 12 the coupling between said shafts and the numeral wheels of the second counter is successively disengaged so that the transfer of tens in the second counter can take place independently from the transfer of tens in the first counter.

The tens transfer wheel 23 of the second counter is freely rotatable on shaft 12 so that shaft 12 is not rotated when a transfer of tens takes place in the second counter contrary to the operation of the tens transfer in the first counter which is combined with rotation of shafts 12.

50 and 51 are pairs of toothed wheels connected with each other by sockets slidable on the shafts carrying the numeral wheels of the second counter. Engaging the sockets of all pairs of wheels 50, 51 is a bar 52 connected by bolts 53 with bar 43, a guiding plate 54 being provided for bolts 53, and springs 55 on bolts 53 being inserted between plate 54 and bar 43.

56, 56' are two rotatable arms connected by a rod 58 and actuated by hand lever 57 so as to push bar 43 forwardly opposite the tension of springs 55 or to give said bar 43 free for returning to rest position under the influence of said springs 55. Dependent from the tension of hand lever 57 and bar 43 operated thereby either wheels 21 and 42 or wheels 27 and 42' are coupled with each other or the wheels of the second counter are entirely disengaged from the wheels of the actuating device with the effect that the zero resetting mechanism of the second counter can be actuated without raising the slide of the machine from the machine support. The operation of bar 43 by means of hand lever 57 and the displacement of wheels 42, 42' of the second counter has the effect of simultaneous operation of bar 52 and of wheels 50, 51 so that the tens transfer in the second counter takes place in the same direction as the rotation of the numeral wheels of the said counter.

The shiftable arrangement of wheels 42 of the second counter may also be employed for the first counter and for the counter indicating the number of revolutions of the crank of the machine. Such shiftable arrangement is of advantage in so far as the disengagement of wheels 42 of said two counters from actuating wheels 17 and 20 allows the actuating of the zero resetting mechanism of these two counters likewise without raising the slide of the machine from the machine support as described above with relation to the second counter. Fig. 15 shows an embodiment of this kind where besides the bar 43 for shifting toothed wheel 42 of the second counter similar bars 43', 43'' are provided with the first counter and for the counter indicating the number of crank revolutions so that wheels 42 of the last named two counters can likewise be shifted and brought out of engagement with wheels 20 and 17 respectively. The several bars 43 are connected with each other and with bar 42 by rods 59 in the form of toothed racks which are actuated by toothed wheels 60 kept in operative connection with each other by toothed rack 61. A handle 62 is provided to rotate one of the toothed wheels 60 and to operate thereby by direct engagement one of the rods 59 and by toothed rack 61 and second wheel 60 the second rod 59. It appears from this construction that the wheels 42 of the three counters are simultaneously brought out of engagement with wheels 17, 20, 21 respectively by rotation of handle 62 so that the numeral wheels of the counters can be reset without raising the slide from its support.

63 indicate the usual zero resetting bars of the three counters. Each zero resetting bar 63 has an actuating nob 64 which is engaged by a hook 65 of a slide 66 with actuating nob 67. Slide 66 allows simultaneous resetting of the three counters after disengagement of wheels 42 of their numeral wheels from the actuating gear wheels.

68 is a pawl for securing the slide in several positions where correct engagement between the counter wheels 42 and their actuating wheels takes place. This pawl is likewise disengaged by actuation of handle 62 so that proper rotation of handle 62 secures perfect release of the slide from the machine body itself and allows lateral displacement of the slide without raising it from the machine support.

The machine as above described is an imperfect one in so far as no means are provided or shown positively locking actuating shafts 12 on each rotation of a stepped toothed cylinder 1 after disengagement of toothed wheel 13 from the teeth of the stepped toothed cylinder. Means for obviating this deficiency are shown in Figs. 8 to 14.

In Figs. 8 to 14 a stepped toothed cylinder is designated again with the numeral 1 and shown firmly mounted on shaft 2. 12 is the shaft parallel to shaft 2 carrying the toothed wheel 13 which can be shifted on shaft 12 and brought into engagement with different parts of the toothed area of the cylinder 1. Firmly connected with gear wheel 13 is a wave wheel 69 having waves or recesses shaped in accordance with the cylindrical periphery of cylinder 1 so that shaft 12 is locked against rotation when a wave of wheel 69 is in engagement with the cylindrical surface of cylinder 1. Means are provided to secure such locking of shaft 12 each time when gear wheel 13 comes out of engagement with the teeth of the cylinder 1 independent from the direction of rotation of said cylinder. For this purpose the teeth on cylinder 1 are not made in the form of long ribs as shown in Fig. 6 of the drawing but the teeth are each interdivided so that nine rows of teeth are provided on the cylinder 1 with interstices 70 between the several rows of teeth allowing the passage of locking wave wheel 69. Between the several rows of teeth recesses are provided in the cylinders each corresponding in its angular width to the angular width of the row of teeth adjacent on one of its sides. The depth of the recesses is so calculated that wave wheel 69 can be freely rotated when positioned in one of the interstices 70.

It is obvious from the above description that in each position of gear wheel 13 with wave wheel 69 the gear wheel can be rotated when in engagement with one row of the teeth of cylinder 1 but that it is immediately locked against rotation when it leaves the last tooth of the actuating row irrespective the direction of rotation of cylinder 1. In order to allow tens transfer besides the recesses 71, 72 between the several rows of teeth in the form of longitudinal grooves on cylinder 1 toothed slides 73, 74 being provided within said grooves 71, 72 and connected with each other by disk 75. Firmly connected with disk 75 is a disk 76 forming a groove 77 between it and disk 75. 78 is a fork engaging said groove 77 carried by a sleeve 79 mounted on a shaft 80. Connected to sleeve 30 is a fork 81 engaging sleeve 79 so that each time when sleeve 30 is shifted on shaft 29 slides 73, 74 within grooves 71, 72 of cylinder 1 are likewise axially shifted. The teeth on slides 73, 74 are so arranged that in rest position the teeth of the slides are in line with the interstices 70 between the rows of teeth on cylinder 1. If however a sleeve 30 is shifted on its shaft 29 preparatory to a transfer of tens then slides 73 and 74 are so displaced that a recessed part of the slide comes opposite each interstice 70 between two rows of teeth of the stepped toothed cylinder 1 so that the wave wheel 69 is no more locked when the cylinder is rotated to a position where a point of the wave wheel is in line with the slide. Therefore, a tens transfer and the rotation of shaft 12 corresponding thereto can be effected. Thereafter the cam disk 32 returns sleeve 30 to its rest position and at the same time the slides 73, 74 are displaced within grooves 71, 72 for an amount equal to the width of a tooth and the teeth of the slides 73, 74 are again in line with the interstices 70 filling the grooves 71, 72 and forming a locking surface for wave wheel 69.

What I claim is:—

1. In a calculating machine having counter actuating shafts with slidable gear members, toothed actuating members for said shiftable gear members adapted to be operated at will in opposite direction, two sets of tens transferring arms for the several number wheels of the counters means adapted to bring the arms of the one set or of the other into operative position depending from the direction of rotation of the said shiftable gear members.

2. In a calculating machine having counter actuating shafts with slidable gear members, toothed actuating members for said shiftable gear members adapted to be operated at will in opposite directions, two sets of tens transferring arms for the several number wheels of the counters arranged in pairs firmly connected with each other and slidable on the carrying shafts of the shiftable gear members including angles varying with the position of the coöperating shafts in the series of shafts, cams coöperating with said tens transferring arms and adapted to shift the tens transferring arms on their carrying shafts and means adapted to bring the arms of the one set or of the other into operative position depending from the direction of rotation of the said shiftable gear members.

3. In a calculating machine having counter actuating shafts with slidable gear members, stepped toothed cylinders mounted parallelly to said shafts rotatable at will in opposite directions and adapted to be coupled with said slidable gear members, the cylinders provided each with teeth of decreasing length on both sides of the longest tooth and means adapted to operate the number wheels of a counter in opposite directions depending from the direction of rotation of the stepped toothed cylinders.

4. In a calculating machine having counter actuating shafts with slidable gear members, toothed actuating members for said shiftable gear members adapted to be operated at will in opposite directions, two counters for indicating the result of calculating operations actuated both by said actuating shafts and gear members and means to alter the direction of operation of one of the counters at will irrespective the direction of rotation of the slidable gear members.

5. In a calculating machine having counter actuating shafts with slidable gear members, toothed actuating members for said shiftable gear members adapted to be operated at will in opposite directions, two counters for indicating the result of calculating operations actuated both by said actuating shafts and gear members, tens transfer mechanism for said counters and means to uncouple one of the counters from the actuating members of the other during a period where tens transfer in the latter possibly may take place.

6. In a calculating machine having stepped toothed cylinders rotatable at will in opposite direction and gear members coöperating therewith and slidable on shafts mounted parallelly to said cylinders, two counters for indicating the result of calculating operations actuated both by said cylinders and shiftable gears and means to alter the direction of operation of one of the counters at will irrespective the direction of rotation of the actuating cylinders and shiftable gears.

7. In a calculating machine having stepped toothed cylinders rotatable at will in opposite directions and gear members coöperating therewith and slidable on shafts mounted parallelly to said cylinders two counters for indicating the result of calculating operations, actuated both by said cylinders and shiftable gears tens transfer mechanism for said counters and means to uncouple one of the counters from the actuating members of the other during a period where tens transfer in the latter possible may take place.

8. In a calculating machine having stepped toothed cylinders rotatable at will in opposite directions and gear members coöperating therewith and slidable on shafts mounted parallelly to said cylinders, two counters for indicating the result of calculating operations, a direct gear connection between said shiftable gear carrying shafts and the first counter and a change gear connection between said shafts and the second counter, tens transfer mechanism for said counters and means to automatically uncouple the second counter from the actuating members of the machine during that portion of rotation of the stepped toothed cylinders where tens transfer in the first counter possibly may take place.

9. In a calculating machine having stepped toothed cylinders rotatable at will in opposite directions and gear members coöperating therewith and slidable on shafts mounted parallelly to said cylinders, two counters for indicating the result of calculating operations, a direct gear connection between said shiftable gear carrying shafts and the first counter and a change gear connection between said shafts and the second counter, said change gear connection comprising for each number wheel a shiftable gear element, a cam controlling the shifting of said change gear element in dependence from the rotation of the corresponding stepped toothed cylinder, so as to automatically uncouple on each rotation of the toothed cylinders the second counter from the actuating members of the machine when the toothed area of the cylinders is out of operative position with relation to the shiftable gear members coöperating with the cylinders.

10. In a calculating machine having actuating stepped toothed cylinders and gear members coöperating therewith and slidable on rotatable shafts, mounted parallelly to said cylinders a slide carrying number wheels mounted parallelly to said cylinders gear wheel mounted slidable on the number wheel shafts and adapted to be brought into and out of gearing with the shafts carrying the slidable gear members, so as to allow zero resetting and shifting of the slide when same is in resting position by disengaging the number wheels from the actuating shafts.

11. In a calculating machine having actuating stepped toothed cylinders and gear members coöperating therewith and slidable on rotatable shafts mounted parallelly to said cylinders a slide carrying number wheels mounted parallelly to said cylinders gear wheels mounted slidable on the number wheel shafts and adapted to be brought into and out of gearing with the shafts carrying the slidable gear members, a zero resetting bar for the number wheels belonging to a counter coupling means between said zero resetting bar and said shiftable gears on the number wheel shafts adapted on operation of the resetting bar to uncouple at first the number wheels from the actuating shafts before the resetting action of the bar takes place.

12. In a calculating machine having actuating stepped toothed cylinders and gear members coöperating therewith and slidable on rotatable shafts mounted parallelly to said cylinders a slide carrying number wheels mounted parallelly to said cylinders gear wheels mounted slidable on the number wheel shafts and adapted to be brought into and out of gearing with the shafts carrying the slidable gear members, the number wheels arranged in groups belonging to different counters, means for simultaneously shifting the gears on the several number wheel shafts of the different counters and zero resetting bars for the number wheels of the several counters adapted to become operated at will independently and simultaneously.

13. In a calculating machine having stepped toothed cylinders rotatable at will in opposite directions and gear members coöperating therewith and slidable on shafts mounted parallelly to said cylinders, two counters for indicating the result of calculating operations, a direct gear connection between said shiftable gear carrying shafts and the first counter and a change gear connection between said shafts and the second counter, tens transfer mechanism for said counters and means to automatically uncouple the second counter from the actuating members of the machine during that portion of rotation of the stepped toothed cylinders where tens transfer in the first counter possibly may take place, the tens transfer mechanism for the first counter comprising a direct gear connection between the shaft to which the tens transfer movement is imparted and the tens transfer mechanism for the second counter comprising a change gear mechanism allowing to transmit the tens transfer movement from the shaft to which it is imparted to the corresponding number wheel shaft either in one or in the other direction.

14. In a calculating machine having stepped toothed cylinders rotatable at will in opposite directions and gear members coöperating therewith and slidable on shafts mounted parallelly to said cylinders two counters for indicating the result of calculating operations, a direct gear connection between said shiftable gear carrying shafts and the first counter and a change gear connection between said shafts and the second counter, tens transfer mechanism for said counters and means to automatically uncouple the second counter from the actuating members of the machine during that portion of rotation of the stepped toothed cylinders where tens transfer in the first counter possibly may take place, the tens transfer mechanism comprising for both the counters rotatable and axially shiftable arms adapted to come into engagement with toothed wheels, said toothed wheels in the first counter being firmly mounted on the number wheels actuating shafts and in the second counter loosely mounted thereon, each of said loosely mounted wheels of the second counter firmly connected with two further gear wheels one of which meshing with an intermediate gear, the second counter having the shafts of its number wheels provided with pairs of firmly connected gears shiftable thereon and adapted to mesh the one directly with the one of said two further gear wheels firmly connected with the wheel operated by a tens transfer arm and the other with said intermediate gear.

15. In a calculating machine having stepped toothed cylinders rotatable at will in opposite directions and gear members coöperating therewith and slidable on shafts mounted parallelly to said cylinders, two counters for indicating the result of calculating operations, a direct gear connection between said shiftable gear carrying shafts and the first counter and a change gear connection between said shafts and the second counter, said change gear connection comprising for each number wheel of the second counter two firmly connected wheels slidable on the number wheel shaft, tens transfer mechanism for said counters, that for the second counter comprising likewise a change gear connection having two firmly connected wheels slidable on the number wheel shaft, the two sets of pairs of gears slidable on the number wheel shafts interconnected with each other, so as to secure unison of direction of operation of the number wheels by the toothed cylinders and by the tens transfer.

16. In a calculating machine having stepped toothed cylinders and slidable gear members adapted to coöperate therewith and mounted on shafts parallel to said cylinders tens transfer mechanism comprising tens transfer arms firmly connected to carriers mounted slidably on the axles of said stepped toothed cylinders, spring tensioned sleeves engaging said carriers of said tens transfer arms, slides adapted to engage said sleeves and to secure them in inoperative and in operative position, said slides adapted to be operated by arms firmly connected with the number wheels of the counters and cams adapted to return the carriers of tens transfer arms into inoperative position.

17. In a calculating device having rotatable stepped toothed cylinders and numeral wheel operating shafts mounted parallelly to said cylinders carrying shiftable gear members, the stepped toothed cylinders adapted to be rotated in opposite directions, locking devices for said numeral wheel operating shafts adapted to be rotated in dependence from the stepped toothed cylinders when in engagement with the shiftable gear members and to become automatically disengaged simultaneously with the shiftable gear members irrespective the direction of rotation of the stepped toothed cylinders, and means for transferring tens from the several numeral wheels to adjacent wheels in opposite directions.

18. In a calculating device having rotatable stepped toothed cylinders and numeral wheel operating shafts mounted parallelly to said cylinders carrying shiftable gear members, the stepped toothed cylinders adapted to be rotated in opposite directions, locking devices for said numeral wheel operating shafts adapted to be rotated in dependence from the stepped toothed cylinders when in engagement with the shiftable gear members and to become automatically disengaged simultaneously with the shiftable gear members irrespective the direction of rotation of the stepped toothed cylinders, the locking devices consisting of wave wheels the waves conforming to the cylindrical surface of the stepped toothed cylinders and the cylinders provided with nine recesses of different angular extension corresponding to the angular extension of the groups of teeth on the toothed cylinders, the recesses permitting free rotation of the wave wheels when in line with same, and means for transferring tens from the several numeral wheels to adjacent wheels in opposite directions.

19. In a calculating device having rotatable stepped toothed cylinders and numeral wheel operating shafts mounted parallelly to said cylinders carrying shiftable gear members, the stepped toothed cylinders adapted to be rotated in opposite directions, locking devices for said numeral wheel operating shafts adapted to be rotated in dependence from the stepped toothed cylinders when in engagement with the shiftable gear members and to become automatically disengaged simultaneously with the shiftable gear members irrespective the direction of rotation of the stepped toothed cylinders, the teeth of the stepped toothed cylinders arranged in rows of variable number and the teeth carrying cylinder being recessed between the different rows of teeth to an angular extension corresponding with relation to each recess to the angular extension of the row of teeth adjacent one side of said recess, and means for transferring tens from the several numeral wheels to adjacent wheels in opposite directions.

20. In a calculating device having rotatable stepped toothed cylinders and numeral wheel operating shafts mounted parallelly to said cylinders carrying shiftable gear members, the stepped toothed cylinders adapted to be rotated in opposite directions, locking devices for said numeral wheel operating shafts adapted to be rotated in dependence from the stepped toothed cylinders when in engagement with the shiftable gear members and to become automatically disengaged simultaneously with the shiftable gear members irrespective the direction of rotation of the stepped toothed cylinders, the locking devices consisting of wave wheels the waves conforming to the cylindrical surface of the stepped toothed cylinders and the cylinders provided with nine recesses of different angular extension corresponding to the angular extension of the groups of teeth on the toothed cylinders, the recesses permitting free rotation of the wave wheels when in line with same, a further set of recesses in said stepped toothed cylinders angularly displaced with relation to said first said set of recesses, and means for transferring tens from the several numeral wheels to adjacent wheels in opposite directions, the recesses of said further set of recesses in the cylinders disengaging the locking wave wheels from the periphery of the stepped toothed cylinders when in tens transfer position.

21. In a calculating device having rotatable stepped toothed cylinders and numeral wheel operating shafts mounted parallelly to said cylinders carrying shiftable gear members, the stepped toothed cylinders adapted to be rotated in opposite directions, locking devices for said numeral wheel operating shafts adapted to be rotated in dependence from the stepped toothed cylinders when in engagement with the shiftable gear members and to become automatically disengaged simultaneously with the shiftable gear members irrespective the direction of rotation of the stepped toothed cylinders, the locking devices consisting of wave wheels the waves conforming to the cylindrical surface of the stepped toothed cylinders and the cylinders provided with nine recesses of different angular extension corresponding to the angular extension of the groups of teeth on the toothed cylinders, the recesses permitting free rotation of the wave wheels when in line with same, a further set of recesses in said stepped toothed cylinders on each side of the toothed area thereof.

22. In a calculating machine having rotatable stepped toothed cylinders and numeral wheel operating gear members coöperating therewith and shiftable on shafts parallel to said cylinders, the shiftable gear members each firmly connected with a locking wave wheel, the cylinders provided each with nine recesses of different angular extension corresponding to the angular extension of the groups of teeth on the toothed cylinders, the recesses permitting free rotation of the wave wheels when in line with same, a longitudinal groove outside the toothed area of each cylinder, tens transferring means adapted to impart limited rotation to the wave wheel carrying shafts, the longitudinal groove on each cylinder so positioned that it coincides with a point of the wave wheel when a tens transfer is to be effected.

23. In a calculating machine having rotatable stepped toothed cylinders and numeral wheel operating gear members coöperating therewith and shiftable on shafts parallel to said cylinders, the shiftable gear members each firmly connected with a locking wave wheel, the cylinders provided each with nine recesses of different angular extension corresponding to the angular extension of the groups of teeth on the toothed cylinders, the recesses permitting free rotation of the wave wheels when in line with same, a longitudinal groove on each side of the toothed area of each cylinder, tens transferring means adapted to impart limited rotation to the wave wheel carrying shafts, the longitudinal grooves on each cylinder so positioned that on rotation of the cylinder in one direction the one groove and on rotation in the opposite direction the other groove coincides with a point of the wave wheel when a tens transfer is to be effected.

24. In a calculating machine having rotatable stepped toothed cylinders and numeral wheel operating gear members coöperating therewith and shiftable on shafts parallel to said cylinders, the shiftable gear members each firmly connected with a locking wave wheel, the cylinders provided each with nine recesses of different angular extension corresponding to the angular extension of the groups of teeth on the toothed cylinders, the recesses permitting free rotation of the wave wheels when in line with same, a longitudinal groove outside the toothed area of each cylinder, a toothed slide within said groove, the teeth lying with their upper surface substantially within the cylindrical surface of the cylinder, tens transferring means comprising tens transfer arms shiftably mounted on the cylinder shafts and in operative connection with said toothed slide, the slides in the several cylinders so positioned and so controlled by the shiftable carriers of the tens transfer arms that each time when a tens transfer is to be effected a point of the wave wheel controlling the rotation of the corresponding actuating shaft is opposite a gap in the cylinder slide.

25. In a calculating machine having rotatable stepped toothed cylinders and numeral wheel operating gear members coöperating therewith and shiftable on shafts parallel to said cylinders, the shiftable gear members each firmly connected with a locking wave wheel, the cylinders provided each with nine recesses of different angular extension corresponding to the angular extension of the groups of teeth on the toothed cylinders, the recesses permitting free rotation of the wave wheels when in line with same, a longitudinal groove on each side of the toothed area of each cylinder, a toothed slide within each of said grooves, the teeth lying with their upper surface substantially within the cylindrical surface of the cylinder, tens transferring means comprising tens transfer arms shiftably mounted on the cylinder shafts and in operative connection with said toothed slides, the slides in the several cylinders so positioned and so controlled by the shiftable carriers of the tens transfer arms that on rotation of the cylinder in one direction each time when a tens transfer is to be effected a point of the wave wheel controlling the rotation of the corresponding actuating shaft is opposite a gap in the slide on one side of the cylinder teeth and on rotation in the other direction opposite a gap in the slide on the other side of the toothed area of the cylinder.

26. In a calculating machine rotatable stepped toothed cylinders having each its longest tooth substantially in the midst of the other teeth, the lateral teeth on both sides decreasing in length from the middle tooth toward the sides, gear members adapted to coöperate with said toothed cylinders and mounted shiftably on shafts parallel to the cylinders, number wheels in operative connection with said shafts and cylinders, locking devices for said number wheel operating shafts adapted to be rotated in dependence from the toothed cylinders when in engagement with the shiftable gear members and to become locked by said cylinders simultaneously with the disengagement of the shiftable gears from the teeth of the cylinders irrespective the direction of rotation of the cylinders.

In testimony whereof I have signed this specification in the presence of two subscribing witnesses.

HEINRICH RAUSCHER.

Witnesses:
WOLDEMAR HAUPT,
HENRY HASPER.

Copies of this patent may be obtained for five cents each, by addressing the "Commissioner of Patents, Washington, D. C."